(No Model.) 2 Sheets—Sheet 1.
W. W. BURCHELL.
PLANTER.
No. 543,764. Patented July 30, 1895.
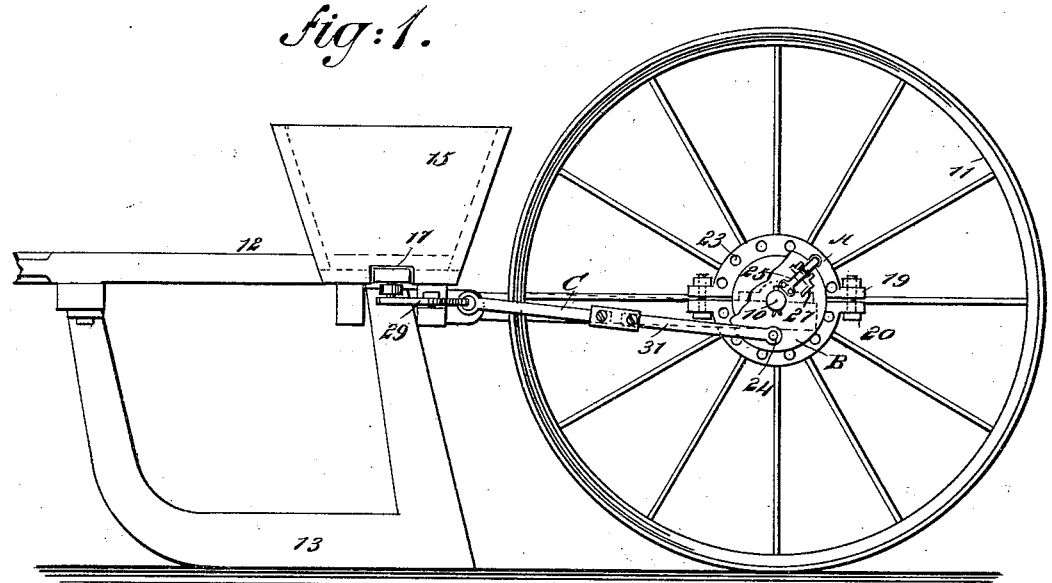
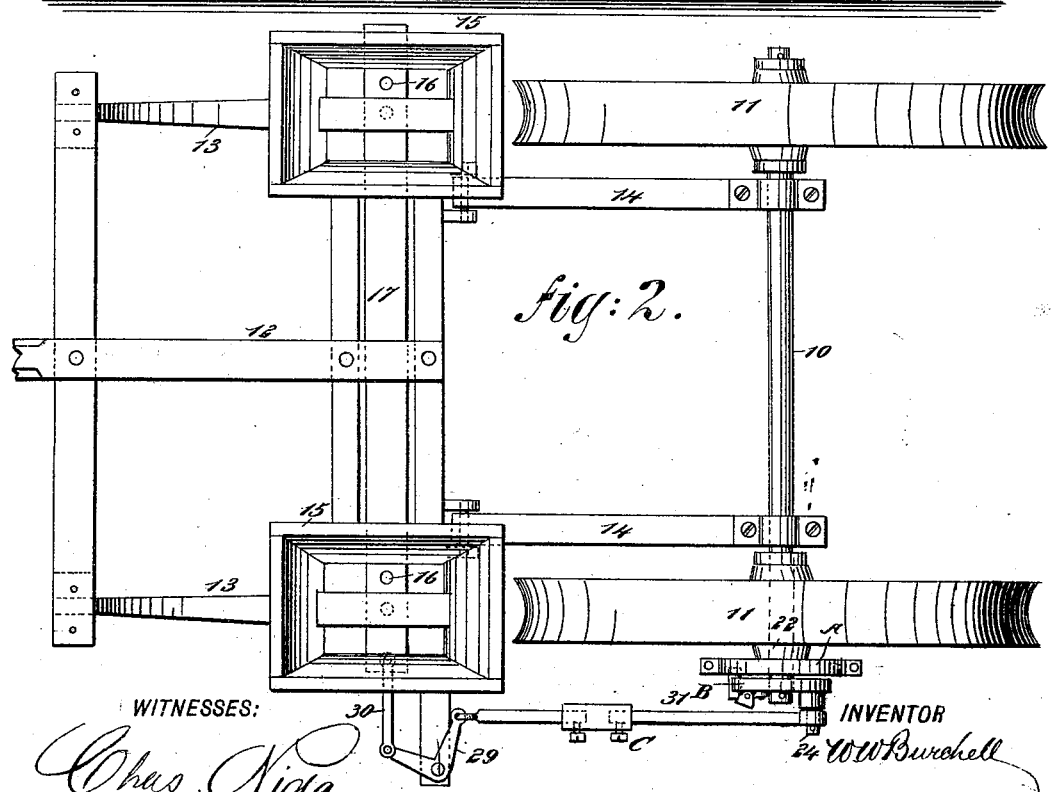
WITNESSES:
Chas. Niola.
Fred Acker.
INVENTOR
W. W. Burchell
BY
Munn & Co.
ATTORNEYS.

(No Model.) 2 Sheets—Sheet 2.
W. W. BURCHELL.
PLANTER.
No. 543,764. Patented July 30, 1895.
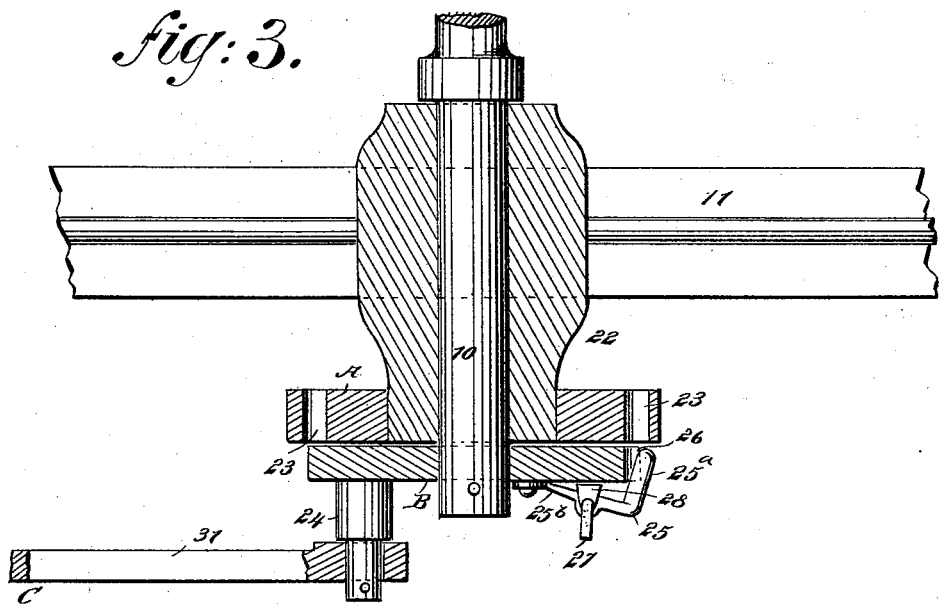
*fig: 3.*
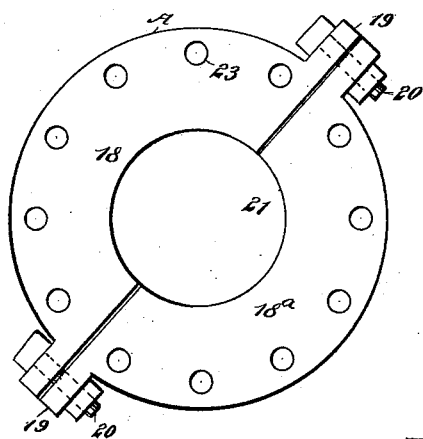
*fig: 5.*
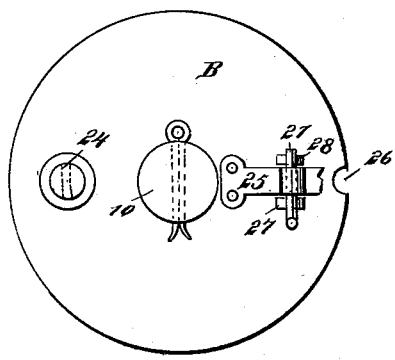
*fig: 6.*
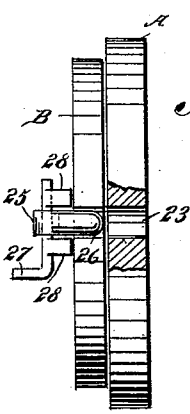
*fig: 4.*
WITNESSES:
Chas. Nicol.
J. Fred. Acker.
INVENTOR
W. W. Burchell
BY Munn & Co
ATTORNEYS.

UNITED STATES PATENT OFFICE.

WALTER W. BURCHELL, OF SUTHERLAND, IOWA.

PLANTER.

SPECIFICATION forming part of Letters Patent No. 543,764, dated July 30, 1895.

Application filed May 28, 1895. Serial No. 550,950. (No model.)

*To all whom it may concern:*

Be it known that I, WALTER W. BURCHELL, of Sutherland, in the county of O'Brien and State of Iowa, have invented a new and useful Improvement in Planters, of which the following is a full, clear, and exact description.

My invention relates to an improvement in planters; and the object of this invention is to provide what may be termed a "self-dropping attachment," operated from one of the ground-wheels and connected with the seed-drop slide.

Another object of the invention is to provide a means whereby the attachment may be expeditiously and conveniently carried into or out of locking engagement with the said ground-wheel and to so construct the attachment that it may be readily applied to any planter having a reciprocating drop-slide.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the planter having the improved attachment applied, a portion of the attachment applied to the ground-wheel being broken away. Fig. 2 is a plan view of the planter and the attachment. Fig. 3 is an enlarged sectional view through the hub of the ground-wheel of the planter and that portion of the device attached to the hub. Fig. 4 is an edge view of that portion of the attachment adapted to be secured to the hub and axle of the ground-wheel, a portion of one of the parts being broken away. Fig. 5 is a front elevation of the disk that is attached to the hub, and Fig. 6 is a front elevation of the crank-disk which is mounted on the axle.

In carrying out the invention the axle 10 of the planter is provided with ground-wheels 11, loosely mounted thereon, and the forward frame 12, supported by the shoes 13, is pivotally connected with beams or arms 14 attached to the axle, as shown in Fig. 2, and the seed-boxes 15 are of the usual construction, the seed finding its escape from the said boxes through openings 16 produced in the reciprocating drop-slide 17.

The attachment proper comprises a sectional disk A, a crank-disk B, and a connection C between the crank-disk and one end of the seed-drop slide. The disk A is made in two sections 18 and 18ª, each section being provided with a lug 19 at opposite sides, and the lugs are connected by bolts 20. The disk is furthermore provided with a central opening 21 of sufficient size to permit the disk to be slipped over the outer end of the hub 22 of a ground-wheel 11, and by making this disk in two sections it may be the more expeditiously and firmly clamped on the hub. The hub-disk A is further provided with a series of apertures or openings 23 circularly arranged near the periphery.

The crank-disk B (shown in Fig. 6) is provided with a crank-pin 24 and a central opening whereby it may be loosely mounted on the axle 10 in front of the hub-disk A, the latter turning with the hub. An angled latch 25 is secured upon the outer face of the crank-disk B, usually at the opposite side to that carrying the crank-pin 24. This latch comprises a head 25ª and shank 25ᵇ, the shank being of a spring material, and it is secured to the disk, while the head 25ª of the said latch is adapted to extend across the periphery of the crank-disk in a recess 26 made to receive it, the said recess when the disk is revolved being brought in registry with the apertures 23 in the hub-disk, so that the head 25ª of the latch may enter any one of these apertures. The latch is provided with a releasing device which may be of any suitable or approved construction, that shown in the drawings consisting of a bolt 27, journaled in the shank portion of the latch and fitted with feet 28 at each side of the latch, whereby when the bolt is turned in a manner to bring the feet in engagement with the crank-disk the latch-head will be held from entering the apertures 23 in the hub-disk; but when the position of the bolt is reversed the spring in the shank of the latch will cause the head thereof to enter the first opening or aperture in the hub-disk that it may be brought over.

The connecting mechanism between the crank-disk and the seed-drop slide consists of an elbow-lever 29, or the equivalent thereof, fulcrumed upon a support at one side of one of the seed-boxes and one member of this elbow-lever is connected by a link 30 with one end of the drop-slide 17, while the other end of the lever is pivotally attached to a pitman 31, the said pitman being in its turn pivoted upon the crank-pin 24. This pitman is made in adjustable sections in order that the attachment may be applied to different machines.

In the operation of the machine the latch is held out of engagement with the crank-disk until the planter is in such position that the next half-turn or full turn, as may be desired, of the ground-wheels will cause the drop slide to drop the seed at a predetermined spot, commencing the hills. The releasing device of the latch is then manipulated to permit the latch-head to enter the nearest aperture 23 in the hub-disk. Therefore the crank-disk will turn with the ground-wheel and the dropping of the seed will uninterruptedly occur either at the complete revolution of the ground-wheel or at every half-revolution thereof, according to the number of openings that may be made in the drop-slide within each seed-box. In Fig. 2 the drop-slide is arranged to drop seed at every half-revolution of the ground-wheel.

I desire it to be understood that although I have shown the attachment as connected to a planter having a laterally-reciprocating seed-drop slide, the connection may be made to a drop-slide of any type, rotary or reciprocating, the attachment remaining the same; but the coupling between the attachment and the drop-slide must necessarily be changed or modified according to the type of planter employed.

Having thus described my invention, I claim as new and desire to secure by Letters Patent—

1. In a planter, a regulating attachment for the seed drop slide, the same consisting of a disk adapted for attachment to the hub of a ground wheel, provided with apertures circularly arranged, a crank disk adapted to be loosely mounted on the axle upon which the hub revolves and having a peripheral opening capable of registering with the apertures in the hub disk, a latch carried by the crank disk and adapted to enter the opening in the hub disk, a shifting device for the said latch, and a pitman connected with the crank disk and adapted for engagement with the seed drop slide of the machine, substantially as set forth.

2. In a planter, the combination, with the axle, a ground wheel thereof and the seed drop slide, of a disk secured upon the hub, having circularly arranged apertures, a crank disk loosely mounted on the axle adjacent to the hub disk, a latch carried by the crank disk and adapted to enter the openings in the hub disk, and means, substantially as described, for connecting the crank disk with the seed drop slide, as and for the purpose set forth.

3. In a planter, the combination, with the axle, a ground wheel thereof and the seed drop slide, of a disk secured upon the hub, having circularly arranged apertures, a crank disk loosely mounted on the axle adjacent to the hub disk, a latch carried by the crank disk and adapted to enter the openings in the hub disk, a pitman connected with the crank pin of the crank disk, a lever connected with the said pitman, and a link connection between the lever and the seed drop slide, substantially as shown and described.

4. In a planter, the combination, with a ground wheel, the seed drop slide and the axle, the ground wheel being loosely mounted on the axle, of a sectional disk provided with clamps, the said disk being secured on the hub of the ground wheel and provided with circularly arranged apertures, a crank disk loosely mounted on the axle, a spring latch secured to the crank disk and adapted to enter any of the openings in the hub disk, means, substantially as described, for throwing the latch out of engagement with the hub disk, a pitman constructed in adjustable sections, connected with the crank pin of the crank disk, a bell crank lever having one member connected with the said pitman, and a link connecting the opposite member with the aforesaid drop slide, as and for the purpose specified.

5. In a planter, a device for regulating from the ground wheel the dropping of the seed, comprising a crank disk revolving independently of the hub and provided with a latch adapted to enter openings in the hub, and a pitman connected with the crank disk and adapted likewise for connection with the said drop slide, as and for the purpose set forth.

WALTER W. BURCHELL.

Witnesses:
CHARLEY H. SWISHER,
J. Y. CORTANO.